Jan. 18, 1966   L. G. HORWITT ETAL   3,229,851
VALVE AND PRESSURE INDICATOR FOR PRESSURIZED CONTAINERS
Filed March 25, 1964   2 Sheets-Sheet 1
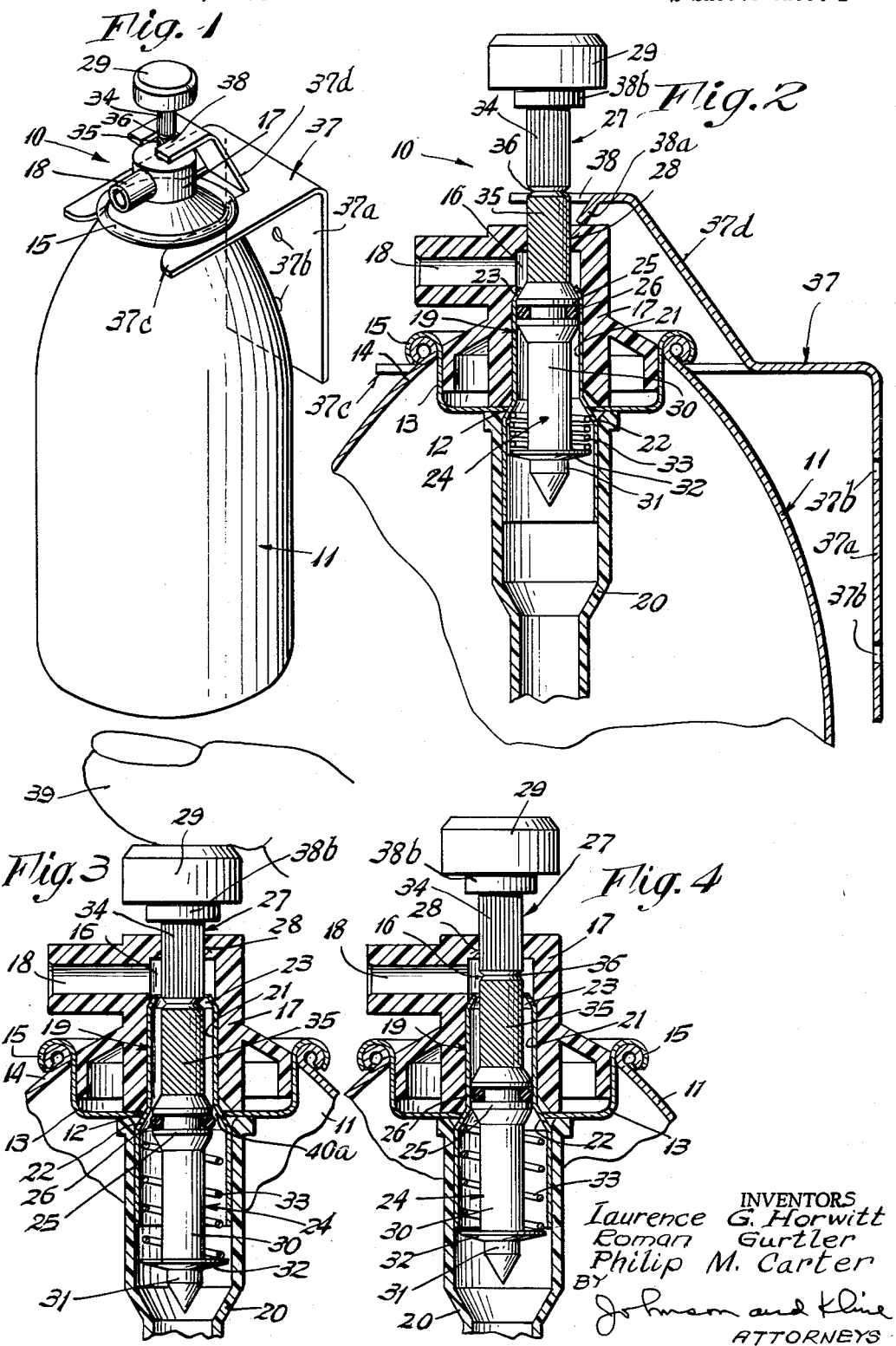
INVENTORS
Laurence G. Horwitt
Roman Gurtler
Philip M. Carter
BY
Johnson and Kline
ATTORNEYS

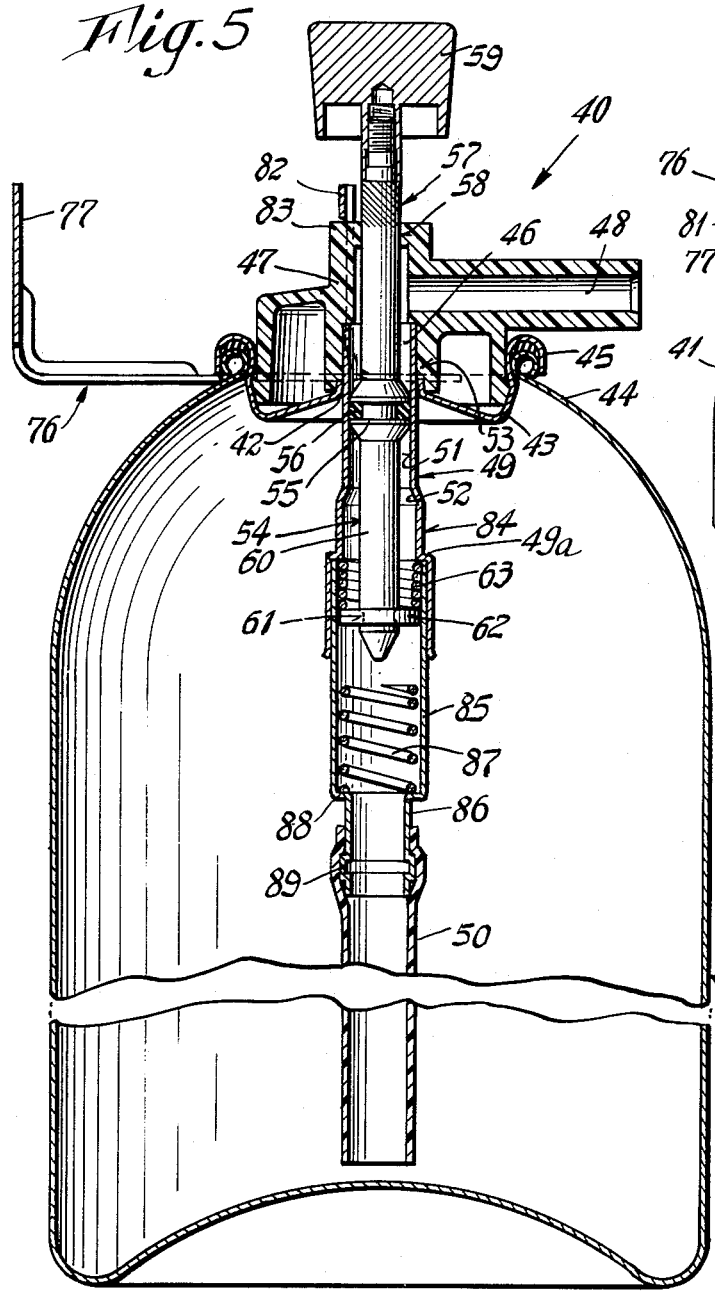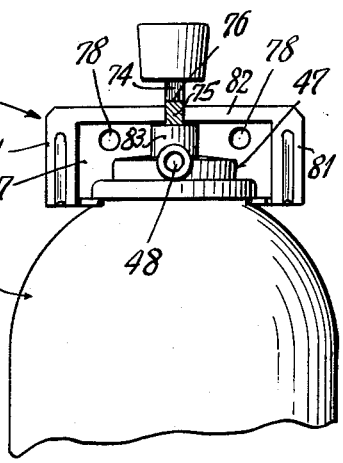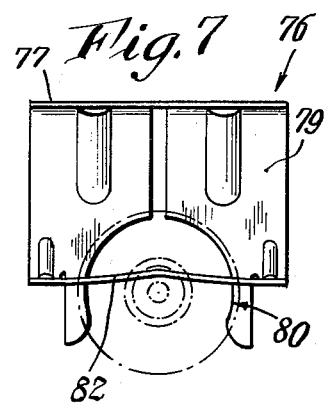

United States Patent Office 3,229,851
Patented Jan. 18, 1966

3,229,851
VALVE AND PRESSURE INDICATOR FOR PRESSURIZED CONTAINERS
Laurence G. Horwitt, New Haven, Conn., and Roman Gurtler, Chester, and Philip M. Carter, Ossining, N.Y., assignors to Casco Products Corporation, a corporation of Connecticut
Filed Mar. 25, 1964, Ser. No. 354,694
13 Claims. (Cl. 222—49)

This invention relates to improvements in pressurized containers and more particularly to valves for controlling the expulsion of material held within a pressurized container, such as a fire extinguisher, and particularly to a valve which serves to provide an indication of the value of the pressure within the container and also mounting means therefor.

While normally in many applications using pressurized containers, it is not serious that the user be unaware of the value of the pressure within the container, in some other instances it is necessary that an indication be constantly given of the pressure within the container in order to be assured that there is sufficient pressure for the device to operate properly. One of such devices is a fire extinguisher and it is normally required that not only must there be a valve for controlling the expulsion of the fire extinguishing material therefrom, but also that the user be able to ascertain by periodic inspection of the extinguisher whether or not it is in condition for effective operation. In the heretofore known types of extinguishers normally the pressure is indicated by a relatively expensive pressure gauge that is in communication with the interior of the pressurized container and is generally completely separate from the valve. These extinguishers however are relatively expensive and hence are normally refilled rather than being so economical that they may be discarded after use.

It is accordingly an object of the present invention to provide a valve and pressure indicator for a pressurized container which, while being capable of being used and refilled, is however so economical to manufacture that it may be discarded after it has been used and no longer has the required pressure.

A further object of the present invention is to provide a valve and pressure indicator which permits the valve to be operated as if there were no indicator cooperating therewith and yet prevents the indicator from operating the valve, even at minimum pressures within the container.

Another feature of this invention is the provision of a pressurized container having a combined valve and pressure indicator in combination with a novel mounting bracket having cooperating parts thereby preventing unintentional or accidental operation of the valve to cause expulsion of the material in the container so long as the container is mounted in the bracket.

These parts further cooperate to permit limited movement of the valve without opening the valve so that it can be ascertained whether or not the valve is functioning properly as a pressure indicator.

Another object of the present invention is to provide a valve and pressure indicator constructed for small pressurized containers which is simple in construction, efficient in use, readily indicates the value of the pressure within the container and is composed of few parts.

In carrying out the present invention the valve and pressure indicator of the present invention has particular utility when employed in a fire extinguisher of relatively small size capable of being conveniently carried in the interior of passenger vehicles for instance, and of the type which may be so inexpensively manufactured that it may be disposed of after use, if desired, rather than being refilled.

The valve and pressure indicator, according to the present invention, is formed to provide a pasasgeway communicating between the interior of the container holding material under pressure and an expelling nozzle. A valve stem is positioned to control passage of fluid through the passageway and is movable, within the passageway, between a sealing or closed position and an opened material expelling position. However, the sealing position is of extended length and thus the stem may have substantial movement in the passageway without the passageway becoming opened to the passage of material. This closed position movement enables the valve stem to be utilized as an indicator of the value of the pressure within the container. Accordingly, the valve stem has a portion which projects outwardly to be visible and carries indicia which denotes by its cooperation with adjacent parts of the valve, the pressure within the container. The projecting urging and movement of the valve stem is caused by the pressure within the container while a spring means is employed which opposes the projecting movement and urges the valve stem inwardly. By proper proportioning of the parts, the projected portion of the valve stem is thus accurately correlated to the value of the pressure within the container.

The present invention moreover prevents the spring means from moving the valve stem to open position even when the pressure within the container is at a minimum and this is effected by limiting the urging of the spring means to a distance which is less than the length of the sealing position of the valve stem.

Accordingly, when the valve stem is moved to its open position by inward movement of the valve stem as by manual operation of a knob, attached to the projecting portion whereon the indicia is located, the spring loses all capability of inward urging as the movement of the valve stem from its maximum closed position to its open position is greater than the fully expanded length of the spring. The minimum pressure which the indicator may show may be easily adjusted to a desired value by altering the fully expanded length of the spring.

Since the device of this invention is capable of intermittent and repeated uses until the pressure in the container falls below an optimum minimum, after the manually operable means on the valve is released the fluid under pressure in the container acting on the valve will return the valve to closed position. In order to return the valve to closed position even when the pressure in the container is below said optimum minimum, in one embodiment of this invention an auxiliary spring is provided to return the valve at least to a passage-closing position when the manual operable means is released.

Other features and advantages will hereinafter appear.

In the drawings:

FIGURE 1 is a perspective view of the valve and pressure indicator of the present invention secured to the outlet of a pressurized container.

FIG. 2 is an axial section thereof, somewhat enlarged, with the parts shown in the maximum pressure indicating position and the valve closed.

FIG. 3 is a section similar to FIG. 2 of the parts of the valve being in the open material expelling position.

FIG. 4 is a section similar to FIG. 3, showing the parts of the valve and pressure indicator at a minimum container pressure position.

FIG. 5 is a vertical section of a modified form of the present invention.

FIG. 6 is a front elevation of the upper portion of the device shown in FIG. 5, showing the container mounted in the bracket.

FIG. 7 is a top plan view of the bracket shown in FIG. 6.

Referring to FIGS. 1, 2, 3 and 4 of the drawings, the valve and pressure indicator is indicated by the reference numeral 10 and is shown secured to a container 11 having an outlet 12 formed in a container cap 13 which is secured to the exterior walls 14 of the container as by rolled edges 15. Preferably the container 11 is otherwise closed and, if a fire extinguisher, may contain dry material under fluid pressure. A passageway, generally indicated by the reference numeral 16, communicates with the outlet 12 of the container and is formed by a one-piece plastic member 17 having an expelling nozzle 18 and a valve sleeve 19. The valve sleeve 19 projects through the outlet 12 and may have, as shown, a tube 20 secured thereto that depends downwardly to the lower portion of the container.

The sleeve 19 is formed to have an intermediate sealing portion 21 of substantially constant diameter together with an enlarged entrance 22 formed by flaring outwardly the sleeve and a reduced exit 23 formed by flaring inwardly the outer end of the sleeve. For controlling the flow of fluid through the passageway 16 there is provided a valve stem 24 having an intermediate sealing portion 25 which preferably contains an O-ring seal 26 with the portion 25 and the O-ring 26 being of a size to form a seal with the sealing portion 21 of the valve sleeve 19.

The valve stem has a reduced upper portion 27 of substantial length that extends through an aperture 28 formed in the member 17 and terminates in a manually operable cap or knob 29. Depending downwardly from the sealing portion 25 is a lower reduced portion 30 and a further reduced diameter end portion 31.

A spring retainer 32, such as a spring locking washer, is forced onto the portion 31, abutting the edge of the portion 30, to form an abutment for a spring 33 which has its other end bearing against the enlarged portion 22 of the valve housing. The spring 33 is normally under compression by movement of the stem outwardly.

With the present structure of a valve and pressure indicator, it will be appreciated that fluid pressure within the container urges the valve stem outwardly and in the position shown in FIG. 2 the stem is shown with the valve in the closed position and with at least a desired amount of pressure within the container. To indicate this pressure to an observer, the reduced upper portion 27 is provided with indicia consisting of an upper portion 34 having one sensible characteristic, such as the color red, and the lower portion 35 having another sensible characteristic, such as the color green, with a division line 36 therebetween. Accordingly, an observer by noting that a substantial portion of the sensible characteristic 35 is visible is thereby informed that there is a pressure within the container which is sufficient to effect proper expulsion of material within the container. If, however, only the sensible characteristic 34 is visible, as shown in FIG. 4, then the user is made aware that there is insufficient pressure within the container for proper operation. Moreover, between these two positions of the valve stem, a user is able to judge the quantity of pressure within the container. While only two sensible characteristics have been shown, naturally, if desired, graduations thereof may be employed.

As indicated above, the present invention also includes the provision of a bracket for supporting the container, in a vertical position for instance, from a wall or other vertical structure. Further, as indicated above, the bracket functionally cooperates with the container and the valve therefor. As shown in FIGS. 1 and 2, the bracket 37 has a vertical extending portion 37a provided with screw holes 37b by means of which it can be fastened to the wall. It has a bifurcated horizontal portion 37c which receives and holds the container by extending it between the body portion 11 and the rolled upper portion 15 of the valve mechanism, whereby the container is suspended from the bracket and frictionally held to the bracket. The bracket 37 has also an upwardly and forwardly extending portion 37d having a horizontal arm 38 which is spaced from the upper surface of the member 17 and a depending lug 38a spacing the arm 38 from said upper surface. The arm 38, when the container is in place on the bracket, is positioned by the lug 38a so that when the valve stem is depressed it will be engaged by a collar 38b on the knob 29 and prevent the depression of the valve stem 24 sufficiently to open the valve on pressure being applied to the knob 29 intentionally or accidentally while the container is mounted in the bracket. Since the permitted movement of the valve stem is not sufficient to open the valve, the user may test the pressure-indicating and valve-functioning of the device to make sure that the valve is not frozen in fixed position and that the indicator is functioning properly by depressing the knob 29 while the container is mounted on the bracket.

When the user desires to have material expelled from the container through the nozzle, the knob or cap 29 is depressed, as by a finger 39 shown in FIG. 3 which moves the stem sufficiently within the sleeve 19 so that the seal between the sealing portion 25 of the stem and the sealing portion 21 of the valve sleeve is released with further inward movement providing an opening 40a between the stem and the sleeve through which material may flow. It will be appreciated that in the open position of the valve (FIG. 3) that the spring 33 has no compression thereon as it fails to abut the enlarged entrance 22 of the sleeve. The normal uncompressed length is thus less than the movement of the valve stem required to release the seal between the sealing portions 21 and 25. The length of the spring is of particular importance when, as shown in FIG. 4, the pressure within the tank has a value which is less than that desired and approaches a minimum but yet because of this normal uncompressed length of the spring it is incapable of forcing the valve stem beyond the sealing portion and thus cause opening of the valve. Thus the spring, according to the present invention, employed in the pressure indicator is incapable even at no pressure within the container from causing the valve to be forced to an opened position. It will be understood that the spring can only effect inward movement of the valve stem for a distance which is less than the length of the elongate sealing surface 21.

Referring to FIGS. 5, 6 and 7 of the drawings, the valve and pressure indicator of the present invention is generally indicated by the reference numeral 40 and is shown secured to a container 41 having an outlet 42 formed in a container cap 43 which is secured to the exterior walls 44 of the container as by rolled edges 45. Preferably the container 41 is otherwise closed and has a fluid pressure passageway 46 which communicates with the outlet 42 and is formed by a one-piece plastic member 47 having an expelling nozzle 48 and a valve sleeve 49. The valve sleeve 49 includes a tube 50 secured thereto that depends downwardly to the lower portion of the container. The sleeve 49 is formed to have an intermediate sealing portion 51 of substantially constant diameter together with an enlarged entrance 52 flaring outwardly the sleeve and an outlet 53 which enters a socket in the lower end of the housing. For controlling the flow of fluid through the passageway 46 there is provided a valve stem 54 having an intermediate sealing portion 55 which preferably contains an O-ring 56 with the portion 55 and the O-ring 56 being of a size to form a seal with the sealing portion 51 of the valve sleeve 49. The valve stem has a reduced upper portion 57 of substantial length that extends through an aperture 58 formed in the member 47 and terminates in a manually operable cap or knob 59. Depending downwardly from the sealing portion 55 is a lower reduced portion 60 and a grooved portion 61. A spring retainer 62, such as a spring locking washer, is forced onto the portion 61 to form an abutment for a spring 63 which has its other end bearing against a shoulder portion 49a of the valve sleeve 49.

The spring 63 is normally held under compression by movement of the stem outwardly of the sleeve.

To indicate this pressure in the container, the reduced portion 57 is provided with indicia consisting of an upper portion 74 having one sensible characteristic, such as the color red, and the lower portion 75 having another sensible characteristic, such as the color green, with a division line 76 therebetween. Accordingly, an observer, by noting that a substantial portion of the green sensible characteristic 75 is visible, is thereby informed that there is a pressure within the container which is sufficient to effect proper expulsion of material within the container. If, however, only the sensible characteristic 74 is visible, then the user is made aware that there is insufficient pressure within the container for proper operation. Moreover, between these two positions of the valve stem, a user is able to judge the quantity of pressure within the container. While only two sensible characteristics have been shown, naturally, if desired, graduations thereof may be employed.

As shown in FIGS. 5, 6 and 7, the bracket 76 cooperates with the container in the same manner as the bracket 37 shown in FIGS. 1 and 2 in supporting the container for quick and easy removal and in acting as a guard against accidental or inadvertent operation of the valve knob 59 and limiting the intentional operation of the knob and valve in testing the function of the latter. The bracket 76, however, is more adapted for mounting in close quarters having a rear vertical portion 77 provided with mounting holes 78, and a bifurcated horizontal portion 79 having a socket portion 80 to removably receive the container.

The front end of the plate 79 is bent up to provide two arm portions 81 and a connecting cross bar 82, the latter being positioned so as to lie in the path of the knob 59 and limit its downward movement, the lower end of the bar engaging a collar 83 on the member 57.

The form of the invention shown in FIG. 5 also differs from that shown in FIGS. 1, 2, 3 and 4 with regard to the structure of the valve sleeve 49 and tube 50.

In FIG. 5 the valve stem is made of two parts 84 and 85, the latter being press-fitted in the part 84 and having a reduced portion 86 forming a shoulder 88 for a spring 87, the upper end of which is in position to engage the spring retainer 62 and has an expanded length so that it only engages the retainer when the pressure in the cylinder is so low that its force alone is not sufficient to cause the valve to enter the reduced portion 51 of the valve sleeve. In other words, the spring 87 is engaged by the spring retainer on the valve stem just before the O-ring 56 enters the enlarged entrance 52 of the sleeve so as to return the O-ring to the narrow portion as soon as the manual pressure is removed from the knob 59.

The reduced portion 86 of the valve sleeve receives the end of the pipe 50 and has an annular bulge 89 to scurely hold the tube 55 which is made of flexible material to the reduced portion 86.

It will accordingly be appreciated that there has been disclosed a valve and pressure indicator for use with a container having material under pressure therein. The valve operates to control the expulsion of material from the container while the pressure indicator serves to provide an indication of the value of pressure within the container. The valve and pressure indicator have common parts with the pressure indicator functioning whenever the valve is not manually operated but yet is incapable of itself operating the valve, while the valve may be operated normally without any effect thereon by the pressure indicator.

While the normal function of the brackets 37 and 76 is to mount the container in a conveniently accessible place for use, it should be understood that even when the device is unmounted the bracket serves as a guard against the accidental or inadvertent operation of the discharge knob of the container. Since the brackets of the present invention do not materially increase the overall dimensions of the container, the latter with the bracket attached may, as a unit, be stored in a cabinet or drawer or, when the device is made small enough, in the glove compartment of an automobile.

Variations and modifications may be made within the scope of the claims and portions of the improvements may be used without others.

We claim:

1. In combination with a container having an outlet communicating with a nozzle from which material under pressure in the container may be expelled, the improvement comprising a valve for controlling the passage of material from the outlet to the nozzle and for indicating the value of pressure in the container, comprising means forming a passageway between the outlet and the nozzle to have a sealing surface and an open end communicating with the outlet, a valve stem mounted for axial movement in the passageway and having a portion formed to be a sealing surface to form a seal with the other sealing surface, one of said surfaces being elongated to provide a determinate travel of the sealing surface on the stem before said sealing surface reaches said open end, spring means having a determinate force formed to yield more or less to the pressure of the material in the container for urging the valve stem and sealing surface toward said open end, means on the stem projecting outwardly of the passageway to be visible and having indicia therealong for enabling the value of the pressure within the container to be indicated, and manually operable means for moving the stem between a closed sealing position and a material expelling position at said outlet whereat the sealing surface of said stem is disposed beyond the sealing surface of said passageway.

2. The combination as defined in claim 1 which includes a member mounted on the container for quick separation therefrom and including means for limiting the axial movement of the valve stem and valve opening direction before said valve stem sealing surface moves to said material expelling position.

3. The combination as defined in claim 2 in which the means for operating the valve stem comprises a manually operable button on the valve stem and the means limiting the movement of the valve stem comprises an abutment obstructing the unlimited movement of the button in valve opening direction.

4. The combination as defined in claim 2 in which said means is a bracket having means for attachment to a suitable supporting surface.

5. In combination with a container having an outlet communicating with a nozzle from which material under pressure in the container may be expelled, the improvement comprising a valve for controlling the passage of material from the outlet to the nozzle and for indicating the value of pressure in the container, comprising means forming a passageway between the outlet and the nozzle to have an elongate sealing surface and an open end communicating with the outlet, a valve stem mounted for axial movement in the passageway and having a portion formed to mate with the sealing surface to form a seal, spring means for urging the valve stem toward said open end only a distance that is less than the length of the elongate sealing surface whereby said spring means can urge the valve stem only when there is engagement between the sealing surface and the mating portion of the valve stem, and means for operating the valve stem to move it out of engagement with the sealing surface to an open, material expelling position.

6. The invention as defined in claim 5 in which the stem is formed to have an end portion including an abutment thereon and the spring means includes a spring encircling the said end portion and having one end engaging the abutment and another end abutting a shoulder at the open end.

7. The combination as defined in claim 5 in which there are additional spring means to urge the valve stem away from said open end only when the sealing surface and mating portion are about to disengage.

8. The combination as defined in claim 7 in which the stem is formed to have an end portion including an abutment thereon and the spring means and said additional spring means are positioned to engage opposite sides of said abutment.

9. In combination with a container having an outlet communicating with a nozzle from which material under pressure in the container may be expelled, the improvement comprising a valve for controlling the passage of material from the outlet to the nozzle and for indicating the value of pressure in the container, comprising means forming a passageway between the outlet and the nozzle to have an elongate sealing surface and an open end communicating with the outlet, a valve stem positioned in said passageway and mounted for axial movement therein, said stem having a portion formed to mate with the sealing surface to form a seal and a reduced outer end portion, spring means urging the valve stem inwardly, said reduced outer end projecting outwardly beyond the passageway forming means to be visible and having indicia thereon for enabling the value of the pressure within the container to be indicated and a knob formed on the end of the reduced portion, said reduced portion projecting outwardly a distance greater than the length of the elongate sealing surface whereby operation of the knob can move the stem out of engagement with the sealing surface to an open, material expelling position.

10. The invention as defined in claim 9 in which the passageway is formed to have a reduced end communicating with the nozzle smaller than the stem mating portion to engage said portion and limit outward movement of the stem.

11. The invention as defined in claim 9 in which the spring means includes a spring, means forming an abutment for one end of the spring on the stem and another abutment in the passageways, for the other end said abutments being spaced a distance apart greater than the normal length of the spring when the valve stem is operated to its open position.

12. In combination with a container having an outlet communicating with a nozzle from which material under pressure in the container may be expelled, the improvement comprising a valve for controlling the passage of material from the outlet to the nozzle and for indicating the value of pressure in the container, comprising means forming a passageway between the outlet and the nozzle to have an elongate sealing surface of substantially constant diameter, an enlarged diameter open end communicating with the outlet and a reduced diameter end communicating with the nozzle, a valve stem mounted for axial movement in the passageway, said stem having a portion formed to mate with the sealing surface to form a seal and a reduced inner end portion and reduced outer end portion, said reduced outer end projecting outwardly beyond the passageway and having visible indicia thereon for indicating the value of the pressure within the container, a knob on the reduced outer end for moving the stem to an open, material expelling position and a spring having one end abutting the enlarged open end and its other end abutting an abutment formed on the reduced inner end portion, said spring having a normal length less than the length of the reduced outer end projecting beyond the passageway forming means.

13. In combination with a container having an outlet communicating with a nozzle from which material under pressure in the container may be expelled, the improvement comprising a valve for controlling the passage of material from the container outlet to the nozzle and for indicating the valve of pressure in the container comprising a housing mounted on the container and having a passageway extending therethrough, said passageway communicating with the outlet of the container and terminating outwardly of the housing in said nozzle, unitary pressure indicating and flow control means extending through said housing and having a portion projecting outwardly thereof, said means being movably mounted in said housing and having another portion which is in continuous sealing engagement with said passageway when said means moves in one direction in response to pressure in the container between the predetermined limits of a plurality of sealing positions, and which is out of sealing engagement with said passageway when said means moves in an opposite direction beyond one of said limits in response to an external force applied to said means, and yieldable means normally urging said movable means in said opposite direction against the pressure in the container but yieldable to said pressure whereby the outwardly projecting portion of said movable means is indicative of the pressure in the container between the predetermined limits of said sealing positions.

References Cited by the Examiner

UNITED STATES PATENTS

| 1,831,193 | 11/1931 | Quitschalle | 169—31 |
| 2,570,655 | 10/1951 | Druge | 137—557 X |

FOREIGN PATENTS 1,302,111   7/1962   France.

M. HENSON WOOD, *Primary Examiner.*

LOUIS J. DEMBO, *Examiner.*

UNITED STATES PATENT OFFICE
CERTIFICATE OF CORRECTION

Patent No. 3,229,851 January 1, 1966

Laurence G. Horwitt et al.

It is hereby certified that error appears in the above numbered patent requiring correction and that the said Letters Patent should read as corrected below.

Column 1, line 61, for "constructed" read -- constructio --; column 2, line 2, for "pasasgeway" read -- passageway --; column 5, line 55, for "scurely" read -- securely --; column line 20, for "elongated" read -- elongate --; line 37, before "opening" insert -- in valve --; column 8, line 19, for "valv read -- value --.

Signed and sealed this 13th day of December 1966.

(SEAL)
Attest:

ERNEST W. SWIDER
Attesting Officer

EDWARD J. BRENNEI
Commissioner of Patents